A. F. SHORE.
SPRING SUSPENSION SYSTEM.
APPLICATION FILED DEC. 11, 1920.
1,392,603.
Patented Oct. 4, 1921.
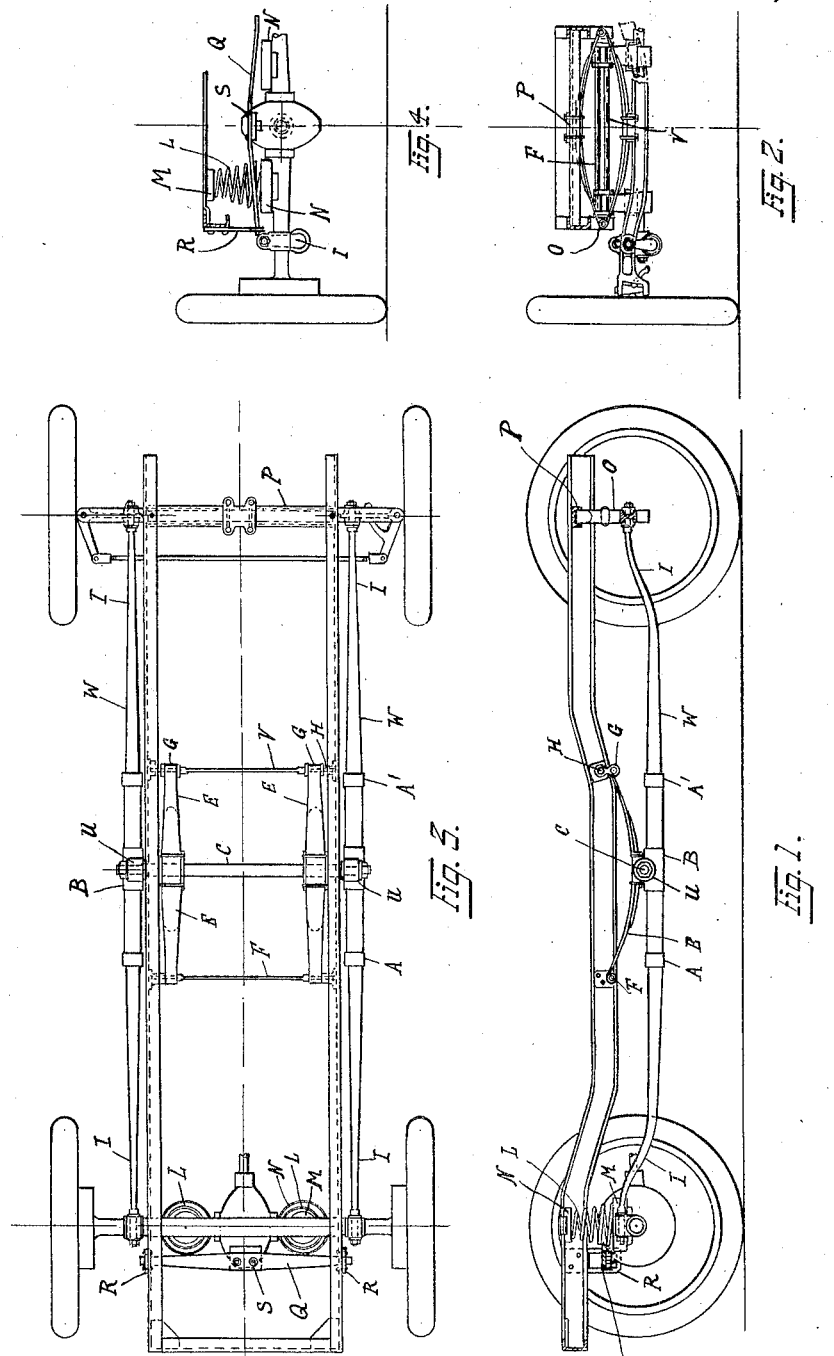
INVENTOR
Albert F. Shore
BY
Gerald Hoffman
ATTORNEY.

UNITED STATES PATENT OFFICE.

ALBERT F. SHORE, OF NEW YORK, N. Y.

SPRING SUSPENSION SYSTEM.

1,392,603.  Specification of Letters Patent.  Patented Oct. 4, 1921.

Application filed December 11, 1920. Serial No. 429,841.

*To all whom it may concern:*

Be it known that I, ALBERT F. SHORE, a citizen of the United States, residing at New York, in the county of New York and State of New York, have invented certain new and useful Improvements in Spring Suspension Systems, of which the following is a full, clear, and exact specification.

This invention relates to spring suspension systems, and especially to a spring suspension system for automobile vehicles, and its main object is to provide in such a system means for overcoming the objectionable oscillations set up in the suspended body and converting such oscillations into vibrations disposed more vertically and parallel, with greatly reduced amplitude and intensity, thus permitting a corresponding reduction in the weight of all parts of the vehicle, such as wheels, tires, bearings, axles, etc. This I accomplish by the provision of a third or fulcrum spring set located approximately midway between the front and rear axles, the function of this spring being to carry the middle portion of the load, particularly under high road speed.

Another main feature of the invention is the provision of a semi-elastic subframe adapted to carry the fulcrum spring set and its load.

Other features of the invention relate to springs at front and rear axles and to opposing spring sets adapted to oppose the springs only when recoils exceed a predetermined amplitude.

These and other features of the present invention will be hereinafter described and claimed and are illustrated in the accompanying drawing, in which—

Figure 1 is a side elevation of the general arrangement of my improved suspension system, partly in section, the front body beam not being shown;

Fig. 2 is a front end elevation, with part of axle beam broken away.

Fig. 3 is a plan view showing the general outlay of the body frame, subframe and springs, and Fig. 4 is a rear elevation of rear wheel set, showing a spring and saddle, opposer spring and stirrup, etc.

Similar characters designate like parts in all the figures of the drawing.

Referring to the drawings, I have shown in Figs. 1 and 3 the general layout of the suspension system, as applied to the frame of an automobile vehicle, while in Figs. 2 and 4 are illustrated the spring sets, opposer springs, etc. for the front and rear axles. Herein W designates a semi-elastic subframe, preferably constructed of seamless tubing and having its ends I swaged and heat treated to produce a spring temper. These ends may be shrunk or screwed into a central portion or union at A and A', reinforcing enlargements being provided to prevent splitting. It will be seen that when these tubular subframe members are bolted rigid or studded free to turn on the front and rear axles the two sets of wheels are joined together in such a flexible manner as is necessary for general vehicle construction. This semi-elastic frame is now ready to receive the springs and the frame for the upper structure. Further flexibility is provided by the manner in which these springs are mounted. At B in the center of the semi-elastic truss is a knuckle which has bearings U for mounting a cross-shaft C which is free to turn. On this cross-shaft are mounted the saddles for the fulcrum spring E, to which they may be fastened in the usual manner. It will thus be seen that while the spring E is free to rock on the shaft C it is rigid to longitudinal and lateral thrusts. These transverse bracings are utilized to produce the proper rigid connection between the subframe and the body frame which is necessary to resist end and side thrusts, especially those encountered in starting or turning a vehicle. This spring, which is unusually wide, is connected to the crossbar F, which is one of the cross braces and an integral member of the upper frame. The forward ends of this spring are joined together by a bar V which passes through links G, which in turn swing on the crossbar H which forms a cross brace and integral member of the upper frame. On the front axle is mounted a full elliptic spring O, whose purpose it is to carry a limited load and at the same time provide the proper cross bracing for the forward upper body to resist side thrusts, as in turning. This spring is mounted and fastened to the axle in the usual manner. Above it is fastened to the upper frame in the groove of an inverted channel bar P.

As the upper body has now been rigidly suspended to resist the usual thrusts, it will follow that the rear springs may be of a kind which have no lateral resistance, but only compressive resistance. Hence the helical spring L is employed. Two of these may be mounted on the axle in saddles at N and M. These axle springs L and O are given exceptional length of stroke and great flexibility. Inasmuch as the amplitude of vibration in them is twice as great as it is in the center fulcrum spring E this is necessary. To guard, however, against undue rebound of the suspended body in the event of extreme depressions or elevations in the road, a counter-acting spring Q becomes necessary. This spring is preferably fastened to the housing of the rear axle, as at S. Its ends are surrounded by a stirrup R which is fastened to the upper frame. When the vehicle is without a load, the counter spring Q bears with moderate pressure on the stirrup R. As the load is increased and the upper body frame with its stirrup R descends as the result of the compression of the load-carrier springs, the contaliver ends of the counter spring Q release contact. As the vehicle passes over the ordinary undulations of the road the ends of the counter spring Q do not touch any part of the stirrup, remaining idle. When an undue depression in the road is struck, with a tendency for the wheels to be pushed down to the bottom by the recoil of the load-supporting springs, the counter spring Q instantly contacts with the lower part and prevents it, thus helping the vehicle to glide over with the least possible jolt to the suspended body and its load upon striking the ascending side of said depression or the level road. Likewise, when obstacles of undue size are mounted by the wheels and the body is thrown up or caused to rebound to exceptional height the opposer springs by virtue of their carrying the positive weight of the wheels and axle mountings again retards the undue rebound by catching them in the stirrups, adding on suddenly the weight of said wheels and under structure to the weight of the upper body. This at once not only retards the progress of rebound of the upper body, but so confuses the rhythmic vibration which would otherwise be set up for a time after, when again running on the normal road, that it would be subdued much more quickly than hitherto.

Inasmuch as lightness of construction and smoothness of riding is the principal object sought in this invention it may be necessary to adopt certain modifications of construction, as for example, a truck carrying a heavy load may require a different kind of truss for the lower frame than would be best for light passenger machines. Likewise, in fastening the ends of said trusses to the axles, a difference may be made. In a light passenger machine these may be bolted in tight so that all twisting motions or strain communicated by the wheels would be met by torsional elasticity of the semi-elastic swaged or reduced extremities. In trucks or heavy passenger machines, because of the larger cross section and less uniform heat treated conditions of the semi-elastic members it will be necessary to substitute torsional elasticity with studs which turn in bearings, such as the bosses on the axles would then become. These bearings while allowing the studs to turn can yet secure the trusses so as to be rigid against end thrust or prying strains. This feature of securing the longitudinal subframe members pivotally on the axles or housing, instead of rigidly, is of especial advantage; if one of the wheels, during the travel of the vehicle, mounts an obstacle, a certain amount of pivotal movement will take place in all four bearings, thus avoiding twisting or torsional strains on the frame members.

By supporting part of the load on the center springs it will be seen that the subframe plays the part of a fulcrum for the wheels with regard to lifting that portion of the weight of the body when passing over obstructions.

What I claim is:

1. In a spring suspension system, the combination with a subframe fulcrum attached directly to the axles or housing thereof of the front and rear supporting wheel sets, of a fulcrum spring set hinged on said subframe for free vertical oscillation and positioned approximately midway between said front and rear wheels and adapted for attachment to the beams of a suspended chassis, and springs positioned at the fore and rear ends of said chassis.

2. In a spring suspension system, the combination with a semi-elastic subframe fulcrum attached directly to the axles or housing thereof of the front and rear supporting wheel sets, of a fulcrum spring set hinged on said subframe for free vertical oscillation and positioned approximately midway between said front and rear wheels and adapted for attachment to the beams of a suspended chassis, and springs positioned at the fore and rear ends of said chassis.

3. In a spring suspension system, the combination with a semi-elastic subframe fulcrum attached directly to the axles or housing thereof of the front and rear supporting wheel sets, of a fulcrum spring set hinged on said subframe for free vertical oscillation and positioned approximately midway between said front and rear wheels and adapted for attachment to the beams of a suspended chassis, and springs positioned at the fore and rear ends of said chassis, some of said balancer springs being adapted to resist longitudinal and side thrusts.

4. In a spring suspension system, the combination with a semi-elastic subframe fulcrum attached directly to the axles or housing thereof of the front and rear supporting wheel sets, of a fulcrum spring set hinged on said subframe for free vertical oscillation and positioned approximately midway between said front and rear wheels and adapted for attachment to the beams of a suspended chassis, springs positioned at the fore and rear ends of said chassis, and supplemental springs adapted to oppose said balancer springs when the vehicle is without a heavy load.

5. In a vehicle, the combination with a fulcrum subframe having longitudinal trusses attached directly to the axles or housings thereof of the supporting wheels, which axles also form cross members for said longitudinal beams, of bearings at or near the middle of said longitudinal trusses, a cross-shaft adapted to turn in said bearings, a supporting saddle for said cross-shaft, a spring carried on said saddle and adapted to suspend the middle part of the vehicle frame, springs for the front and rear axles, and supplementary springs adapted to oppose said balancer springs to arrest undue recoil oscillations of the vehicle frame.

6. In a vehicle, the combination with a fulcrum subframe having semi-elastic longitudinal trusses attached directly to the axles or housings thereof of the supporting wheels, which axles also form cross members for said longitudinal trusses, of bearings at or near the middle of said longitudinal trusses, a cross-shaft adapted to turn in said bearings, a supporting saddle for said cross-shaft, a spring carried on said saddle and adapted to suspend the middle part of the vehicle frame, end springs for the front and rear axles, and supplementary springs adapted to oppose said end springs to arrest undue recoil oscillations of the vehicle frame.

7. A vehicle embodying a semi-elastic subframe adapted to support the middle portion of the weight of said vehicle, a spring hinged on said subframe near the middle thereof and adapted to carry the middle part of the frame of the vehicle, springs near each end of said vehicle, supplemental springs adapted to oppose said balancer springs when the vehicle is not heavily loaded, means for permitting disengagement of said supplemental springs when the vehicle is under load, and means for re-engaging said supplemental springs upon a recoil exceeding a predetermined amplitude.

8. A vehicle embodying a semi-elastic subframe adapted to form a fulcrum for part of the upper suspended load, horizontally disposed leaf springs hinged near the center of the longitudinal beams of said subframe, an upper main frame for said vehicle, means for rigidly securing said springs at their ends to said main frame, link connections between the forward ends of said springs and the main frame, a front spring of full elliptic form parallel with the axle and adapted to resist side thrusts, helical springs for the rear axle, opposer springs for the rear axle, and stirrups for the upper frame and surrounding the ends of the opposer springs, said opposer springs being adapted to oppose said springs only when recoil exceeds a predetermined amplitude.

9. In a vehicle having front and rear axles, a subframe embodying longitudinally extending frame members having rigid central portions and semi-elastic ends, said ends being pivotally supported on said front and rear axles, and a vehicle frame suspended upon springs carried by said subframe and axles.

10. In a vehicle having front and rear axles, bearings carried by said axles, a subframe embodying longitudinally extending frame members having rigid central portions and semi-elastic ends, said ends being pivotally suported in said bearings, and a vehicle frame suspended upon springs carried by said subframe and axles.

11. In a vehicle having front and rear axles, transverse bearings, carried by said axles, a subframe embodying longitudinally extending frame members, each made up of a central rigid portion having semi-elastic end portions attached thereo, said end portions being adapted to be pivotally supported in said transverse bearings, and a vehicle frame suspended upon springs carried by said subframe and axles.

In testimony whereof, I affix my signature.

ALBERT F. SHORE.